UNITED STATES PATENT OFFICE.

ANTONIO RIBEIRO DA SILVA BRAGA, OF SÃO PAULO, BRAZIL.

METHOD OF MANUFACTURING FOOD PRODUCTS.

No. 829,254. Specification of Letters Patent. Patented Aug. 21, 1906.

Application filed April 4, 1904. Serial No. 201,455.

*To all whom it may concern:*

Be it known that I, ANTONIO RIBEIRO DA SILVA BRAGA, a citizen of the Republic of Brazil, residing at the city of São Paulo, State of São Paulo, Republic of Brazil, have invented certain new and useful Improvements in Methods of Manufacturing Food Products, of which the following is a specification.

This invention relates to a method of manufacturing a food product in either a liquid form or in the form of a soft paste; and the object thereof is to obtain a food product comprising a vegetable substance and a meat substance, said product having a less proportion of potassium salts and not containing papain, at the same time serving as a thoroughly nutritious food product.

Briefly described, the product is obtained by combining the fruit of the papaw (*Carica papaya*) with meat, and the manner in which the product is obtained from such combination is as follows: The fruit of the papaw (*Carica papaya*) just before it reaches the point of ripening is used and is combined with meat, whether beef or other kind. The said mixture is then put through a maceration process, and in order to help the chemical biological action the fruit, as well as the meat, is reduced to as small particles as may be possible to accomplish by any suitable means for such purpose. The maceration is carried out in a watery solution acidulated with hydrochloric acid in the proportion preferably of one part of acid to five thousand parts of water. In this step of the method the hard fat—that is, the solid substance and not the fat which is the liquid grease—is spontaneously separated. The hard fat adheres to the sides of the vessel and to the apparatus used for stirring the mass. The maceration of the mass should preferably be carried on at a temperature below 40° centigrade, and if it should be necessary to increase the temperature the increase should not be allowed to exceed the outside limit of 70° centigrade. After the maceration has been continued some time and the fibers and coarser parts become thoroughly released and the mass gives warning of changing into an hydrate by increasing in volume the hard fat is removed from the liquid formed during the fermentation of the mass, and the fermented liquid is then boiled. After boiling the liquid is then passed into an apparatus suitable for the separation of the liquid from the murk and other remains. Once the liquid has been cooled the hard fat that has been left over becomes solidified and is very easily removed. The next step is to absorb the liquid, preferably through the medium of a vacuum apparatus, and after the evaporation has taken place a pasty or soft extract containing all the salt elements of the meat remains. Once the product has been brought to the consistency of a paste or to a soft condition it may be dried a little more and placed in pots, or instead of being dried it can be dissolved in pure neutral glycerin in order to obtain the product in liquid form. The proportion of glycerin required varies, preferably, between forty and sixty per cent. in order that the liquid product shall have a density ranging from twenty to twenty-four specific gravity, as determined by Baumé's hydrometer.

The proportion of acid in the water should be as small as will produce the desired result—namely, about one in five thousand. If the acid be used in greater proportions, it may result in causing various inconveniences during the operation. The proportional amount of water to be used varies slightly in accordance with the fatness of the meat. The hard fat or extract cannot be used as a food stuff. However, there is a fine grease contained in the extract which may be retained on account of its nourishing qualities. In order, however, to further separate the smallest particles of hard fat that may have been left in the product, a suitable filtering apparatus may be employed.

The method is carried out in a closed apparatus, and the product obtained thereby is sterilized and free from micro-organisms.

The product obtained by the method does not contain papain, nor can it contain papain on account of the high temperature employed and also owing to the partial syntonization that the albuminoids of the fruit have undergone.

The product obtained from the hereinbefore-described method has less proportion, not quantity, of potassium salts than other forms of food products, which salts have, owing to their large percentage, caused several such products to be condemned as detrimental to health. The decrease of patassium salts as compared with the proportions thereof contained in the meat is explained by the increase in volume of the meat in a pasty condition by there being in addition thereto the paste from the juicy parts of the papaw fruit.

Having thus fully described my invention, what I claim as new, and desire to secure by Letters Patent, is—

1. A method of manufacturing a food product, comprising the combining of small particles of meat and small particles of the ripening fruit of the *Carica papaya* in its natural condition, macerating the mass at a temperature not exceeding 70° centigrade in the presence of acidulated water and removing the separated fat from the liquid formed during the fermentation of the mass, then boiling the fermented liquid, and then evaporating the liquid to form a pasty residuum.

2. A method of manufacturing a food product, comprising the combining of small particles of meat and small particles of the ripening fruit of the *Carica papaya* in its natural condition, macerating the mass at a temperature not exceeding 70° centigrade in the presence of acidulated water and removing the separated fat from the liquid formed during the fermentation of the mass, then boiling the fermented liquid, then evaporating the liquid to form a pasty residiuum, and then suitably drying and dissolving the liquid in neutral glycerin.

In testimony whereof I have hereunto set my hand in presence of two subscribing witnesses.

ANTONIO RIBEIRO DA SILVA BRAGA.

Witnesses:
CHARLES JOHN DULLEY,
W. H. LAWRENCE.